(12) United States Patent
Anderson (10) Patent No.: US 8,807,601 B2
(45) Date of Patent: Aug. 19, 2014

(54) COMPRESSION SEAL ASSEMBLY

(75) Inventor: James R. Anderson, Menominee, MI (US)

(73) Assignee: Evergreen Tool Co., Inc., Menominee, MI (US)

( * ) Notice: Subject to any disclaimer, the term of this patent is extended or adjusted under 35 U.S.C. 154(b) by 304 days.

(21) Appl. No.: 13/038,158

(22) Filed: Mar. 1, 2011

(65) Prior Publication Data
US 2012/0224933 A1 Sep. 6, 2012

(51) Int. Cl.
*F16L 5/06* (2006.01)

(52) U.S. Cl.
USPC .......... 285/139.2; 285/139.3; 285/141.1; 285/206; 285/208; 285/344

(58) Field of Classification Search
USPC ........ 285/136.1, 137.11, 139.1, 139.2, 139.3, 285/141.1, 143.1, 205, 206, 207, 208, 285/154.3, 154.4, 344
See application file for complete search history.

(56) References Cited

U.S. PATENT DOCUMENTS

| | | | | |
|---|---|---|---|---|
| 766,083 A * | 7/1904 | Watts | ................. | 222/90 |
| 1,018,354 A * | 2/1912 | Fairfield | ................. | 285/139.1 |
| 1,398,083 A * | 11/1921 | Tibbetts | ................. | 285/209 |
| 2,397,290 A * | 3/1946 | Rasmussen | ................. | 277/606 |
| 2,630,339 A * | 3/1953 | Appleton | ................. | 285/154.1 |
| 3,181,899 A * | 5/1965 | McKnight, Jr. | ................. | 285/139.2 |
| 3,915,477 A * | 10/1975 | Timmons | ................. | 285/40 |
| 4,676,533 A * | 6/1987 | Gerondale | ................. | 285/139.2 |
| 5,037,140 A * | 8/1991 | Anderson | ................. | 285/139.2 |
| 6,637,778 B2 * | 10/2003 | Benjey | ................. | 285/209 |
| 2005/0077725 A1 * | 4/2005 | Bartholoma et al. | ................. | 285/143.1 |
| 2011/0031740 A1 * | 2/2011 | Stone | ................. | 285/139.2 |

OTHER PUBLICATIONS

Ameribest Fasteners, Installation Toggle Bolts, http://www.ameribestfasteners.com/installation_toggle_bolts.htm, available at least since Feb. 27, 2010.

* cited by examiner

*Primary Examiner* — James Hewitt
(74) *Attorney, Agent, or Firm* — Michael Best & Friedrich LLP (57) ABSTRACT

A compression seal assembly that can be installed on a wall without requiring access to both sides of the wall. The compression seal comprises a core member, a split washer, a gasket, and a first nut. The core member includes a cylindrical body and a flange rigidly attached to the cylindrical body. The cylindrical body includes a smooth cylindrical portion separating the flange from a first set of threads. The split washer is helical shaped and has a first end and a second end. The split washer is ramped through the hole until the split washer is entirely on the first side of the wall. A gasket is then inserted onto the smooth cylindrical portion adjacent the second side of the wall, and the first nut is threaded onto the first set of threads. As the first nut is tightened, the split washer, the wall and the gasket are compressed between the flange and first nut.

16 Claims, 6 Drawing Sheets

COMPRESSION SEAL ASSEMBLY

BACKGROUND

The present invention relates to the field of compression seals. Specifically, the present invention discloses a compression seal assembly for electrical or other conduit that can be installed on a wall where access to the opposite side is limited or impractical.

Conventional seals typically require access to both sides of the wall on which the seal is mounted, either by simultaneous coordination by persons on each side or by installing components to one side and then the other. Such conventional seals require that one component (e.g., a nut) be held on one side of the wall with a wrench while another component on the other side of the wall is rotated with another wrench. It is therefore desired to provide a seal assembly that requires access to only one side of the wall on which the seal is to be mounted.

SUMMARY

In one embodiment, the invention provides a compression seal assembly adapted for mounting to a wall having first and second oppositely-facing sides and a hole having a hole diameter. The compression seal assembly comprises: a core member, a first set of external threads, a first nut, and a split washer. The core member includes a cylindrical body and a flange. The cylindrical body defines a longitudinal axis and has a first end and a second end. The flange is rigidly attached to the first end of the cylindrical body and has a flange outer diameter that is larger than the cylindrical body but smaller than the hole diameter. The flange includes a bearing surface facing axially toward the second end of the cylindrical body. The first set of external threads is located on an outer surface of the cylindrical body. The first nut is threaded onto the first set of external threads. The split washer surrounds the cylindrical body adjacent the bearing surface of the flange and is helical-shaped. The split washer has first and second ends defining an axial gap therebetween, and the split washer has an inner edge defining an inner diameter that is larger than the cylindrical body and an outer edge defining an outer diameter that is larger than the hole diameter. The first nut is positioned on the second side of the wall and the split washer and flange are positioned on the first side of the wall, wherein tightening the first nut on the first set of external threads compresses the split washer and wall between the flange and first nut, such that the split washer is deflected into a flat condition to apply an axial load on the first nut.

In another embodiment the invention provides a method of installing a compression seal assembly to a wall having first and second oppositely-facing sides and a hole having a hole diameter. The method comprises providing a core member including a cylindrical body and flange, the cylindrical body having a first end and a second end, the flange being rigidly attached to the first end and defining a bearing surface facing axially toward the second end of the cylindrical body; then guiding a split washer over the second end of the cylindrical body and positioning the split washer such that the split washer abuts the second side of the wall, the split washer having a first end and a second end and an axial gap defined therebetween, the split washer having an outer diameter that is larger than the hole diameter; then inserting the split washer into the hole such that the edge of the hole is positioned within the axial gap, the first end of the split washer being located on the first side of the wall and the second end of the split washer being located on the second side of the wall; then ramping the split washer through the hole such that the entire split washer passes from the second side of the wall to the first side of the wall; then threading a first nut onto a first set of external threads located on the cylindrical body, the first nut being threaded until the wall and split washer are compressed between the flange bearing surface and the first nut.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
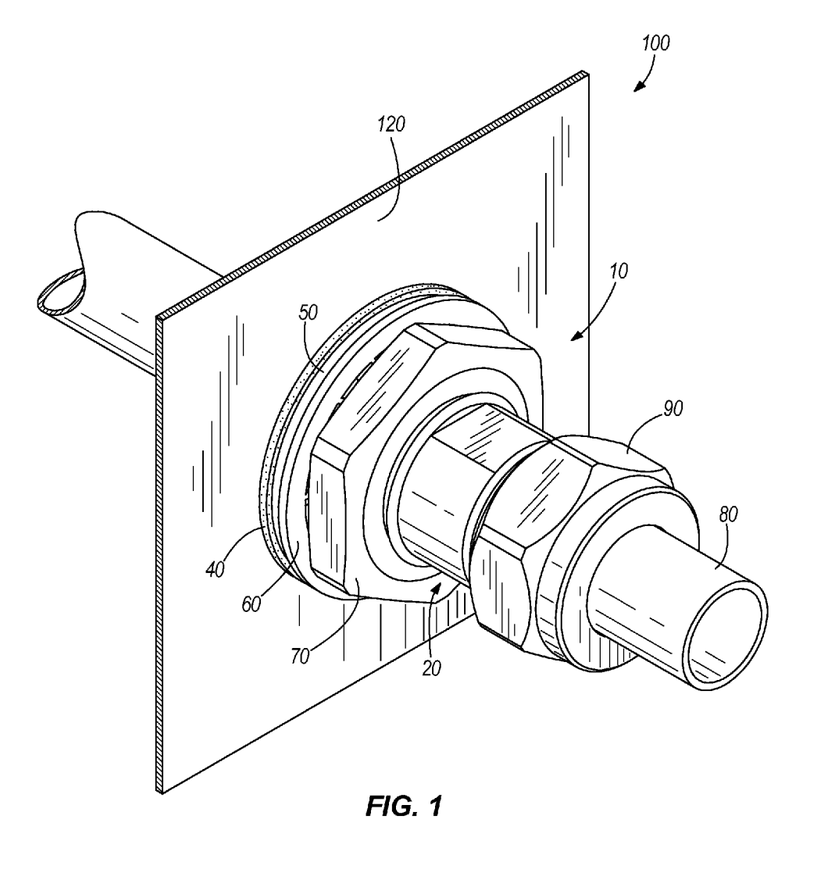
FIG. 1 is a perspective view of the compression seal assembly, as shown from the installation side of the wall.
Figure 2:
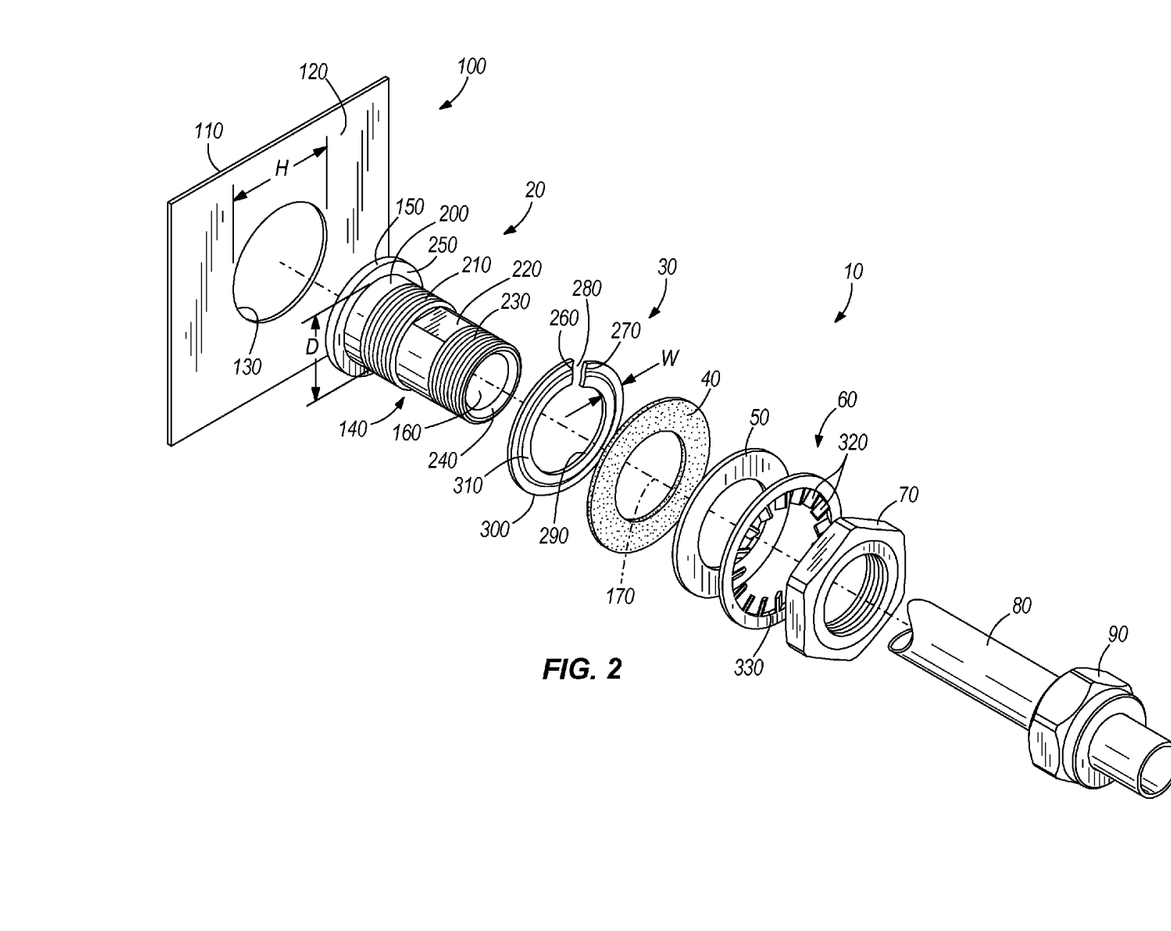
FIG. 2 is an exploded perspective view of the compression seal assembly shown in FIG. 1.

FIGS. 1 and 2 illustrate a compression seal assembly 10 comprising a core member 20, a split washer 30, a gasket 40, a flat washer 50, a lock washer 60, and a first nut 70. A conduit 80 is secured to the compression seal assembly 10 by a compression nut 90. The compression seal assembly 10 mounts to a wall 100, which includes a first side 110, an oppositely facing second side 120, and a hole 130 having diameter H.

Figure 3:
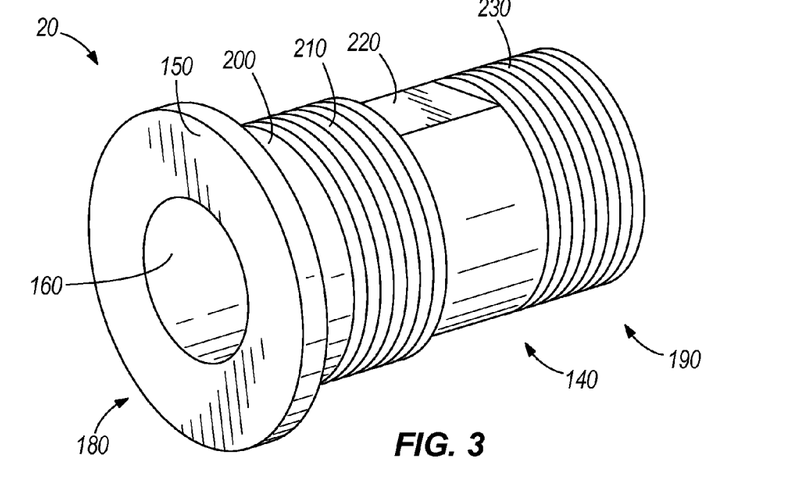
FIG. 3 is a perspective view of the core member.
Figure 4:
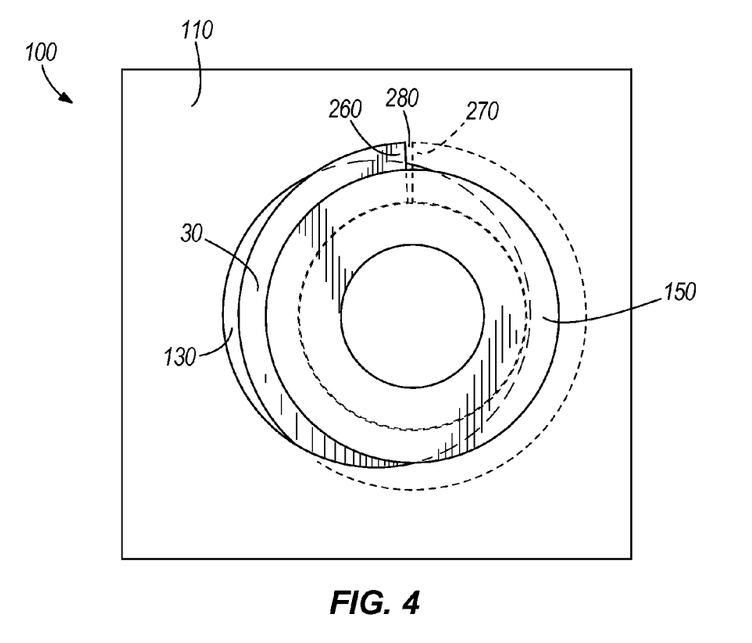
FIG. 4 is a plan view of the compression seal assembly being installed, showing the split washer at an initial stage of ramping through the wall hole.

As shown in FIGS. 2 and 3, the core member 20 includes a cylindrical body 140, a flange 150, and an internal bore 160 extending through the cylindrical body 140 and the flange 150. The cylindrical body 140 defines a longitudinal axis 170 (FIG. 2). The terms "longitudinal", "axial" and variations thereof with respect to any portion of the compression seal assembly 10 means extending in a direction parallel to the longitudinal axis 170. "Circumferentially" and variations thereof means along an arc or curve centered on the longitudinal axis 170 and in a plane perpendicular to the longitudinal axis 170.

The cylindrical body 140 includes a first end 180, a second end 190 (FIG. 3), a smooth cylindrical portion 200, a first set of external threads 210, facets 220, a second set of external threads 230, and an internal bevel surface 240 (FIG. 2). The smooth cylindrical portion 200 is located at the first end 180 of the cylindrical body 140 and has an outer diameter D that is smaller than hole diameter H. The smooth cylindrical portion 200 separates the flange 150 from the first threads 210. The facets 220 separate the first threads 210 from the second threads 230, which are proximate to the second end 190. The facets 220 (only one of which is shown in FIGS. 2 and 3) are defined by flat surfaces on the core member 20, located on diametrically opposed external sides of the cylindrical body 140. As used herein, "diametrically opposed" means positioned circumferentially and separated by an angle of 180°. The bevel surface 240 extends circumferentially around the bore 160 proximate to the second end 190.

With continued reference to FIGS. 2 and 3, the flange 150 is ring-shaped such that the inner hole is defined by the internal bore 160. The flange 150 is rigidly attached to the first end 180 of the cylindrical body 140. As used herein, "rigidly attached" refers to components or connections that are permanent or not easily removable and may include, for example, bolted connections, welded connections, or two parts that are formed integrally. The flange 150 is adjacent the smooth cylindrical portion 200 and defines a bearing surface 250 (FIG. 2) that faces axially toward the second end 190 of the cylindrical body 140.

Figure 8:
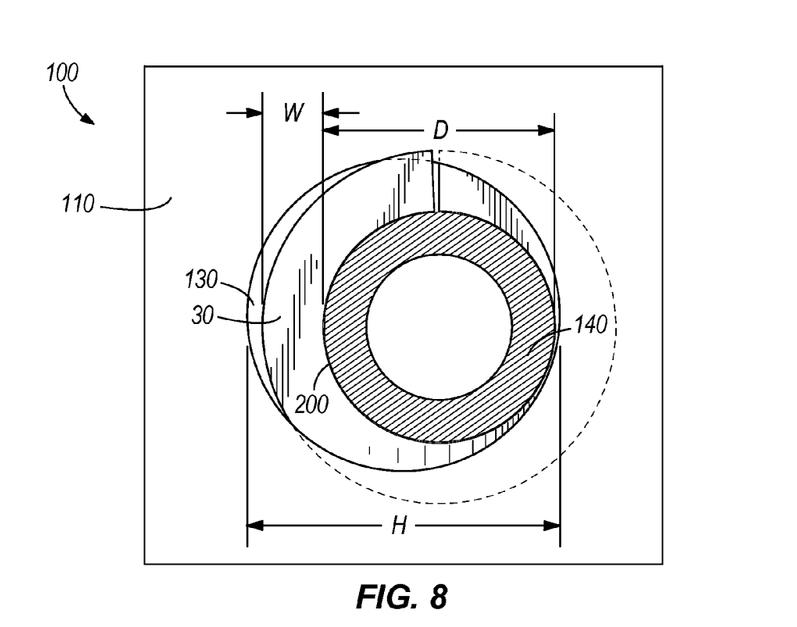
FIG. 8 is a section view of the compression seal assembly, through the core member, showing the split washer at an intermediate stage of ramping through the wall hole.

As shown in FIG. 2, the split washer 30 has a helical shape, with a first end 260 and a second end 270 separated by an axial gap 280. The split washer 30 includes an inner edge 290, an outer edge 300, and a seat 310 extending circumferentially between the inner edge 290 and outer edge 300. The split washer 30 has a width W measured between the inner edge 290 and the outer edge 300. As illustrated in FIG. 8, the hole diameter H is larger than the width W of the split washer 30 plus the outer diameter D of the smooth cylindrical portion 200.

As shown in FIG. 2, the gasket 40 is ring-shaped with an inner diameter equal to the outer diameter D of the smooth cylindrical portion 200 of the cylindrical body 140, such that the gasket 40 forms a close fit when mounted on the smooth cylindrical portion 200. The gasket 40 also includes an outer diameter larger than the hole diameter H.

In the illustrated embodiment, the flat washer 50 is ring-shaped and has an inner diameter larger than the smooth cylindrical portion 200 and an outer diameter larger than the hole diameter H. The lock washer 60 is ring-shaped and has dimensions similar to the flat washer 50. The lock washer 60 includes a plurality of teeth 320 positioned circumferentially along an inner edge 330. Flat washers and lock washers are generally known in the prior art, and no further explanation of their features is provided here.

The conduit 80 has a cylindrical shape and may be adapted to carry, for example, electrical wiring or refrigerant fluid. The compression nut 90 includes an internal lock ring (not shown) that exerts a circumferential force as the compression nut 90 is tightened. Other aspects of compression nuts are generally well known in the art and no further explanation of them is provided here.

Figure 5:
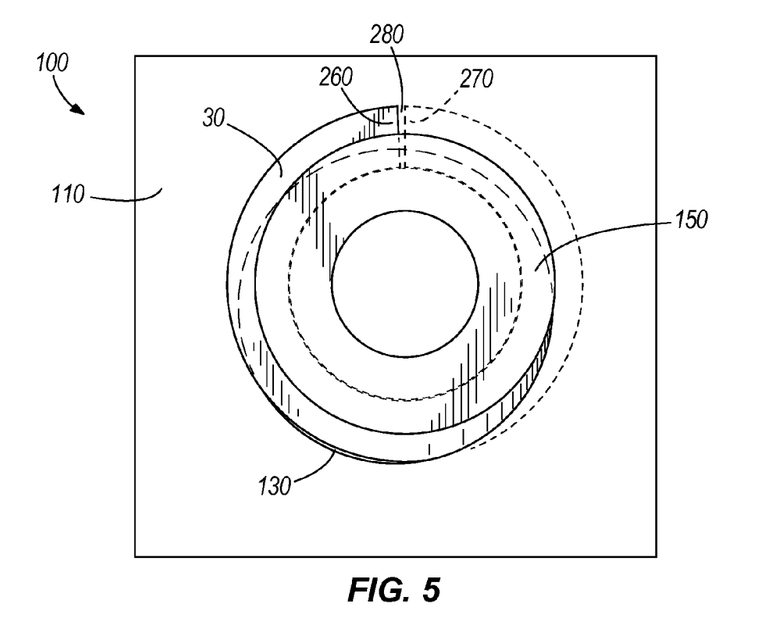
FIG. 5 is a plan view of the compression seal assembly being installed, showing the split washer at an intermediate stage of ramping through the wall hole.
Figure 6:
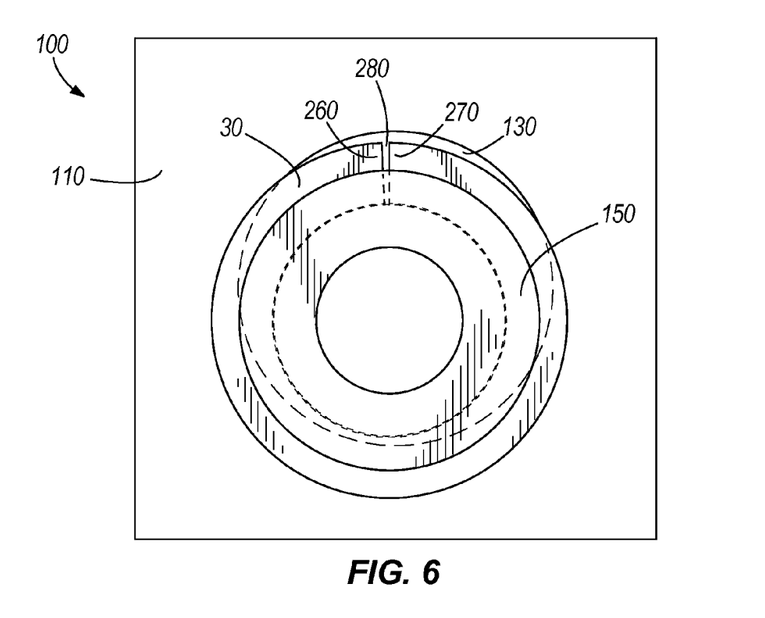
FIG. 6 is a plan view of the compression seal assembly being installed, showing the split washer at a final stage of ramping through the wall hole.

With reference to FIGS. 4-7, to install the compression seal assembly 10, the flange 150 of the core member 20 is inserted through the wall hole 130 from the second side 120 of the wall 100 to the first side 110. The split washer 30 is then inserted around the cylindrical body 140 from the second end 190 of the cylindrical body 140 and positioned such that the edge of the hole 130 is positioned within the axial gap 280 between the first end 260 of the split washer 30 and second end 270 of the split washer 30. The split washer 30 is then ramped through the wall hole 130 (FIGS. 5 and 6). As used herein, "ramping" is the process by which the split washer 30 is moved in a circular motion about the longitudinal axis 170 such that at least one side of the wall 100 slides along the circumference of the split washer 30 from the first end 260 to the second end 270 of the split washer 30. At the position shown in FIG. 5, the split washer 30 has been moved in a circular motion such that approximately half of the split washer 30 has been passed through the hole 130 to the first side 110 of the wall 100, while the other half of the split washer 30 (illustrated by hidden lines) remains on the second side 120. Referring to FIG. 6, as the split washer 30 is further moved in a circular manner, the other half of the split washer 30 is passed to the first side 110.

Next, the gasket 40 is inserted onto the cylindrical body 140 from the second end 190 and positioned such that the gasket 40 abuts the second side 120 of the wall 100. The flat washer 50 and lock washer 60 are then inserted from the second end 190 of the cylindrical body 140 such that the flat washer 50 abuts the gasket 40 and the lock washer 60 abuts the flat washer 50. The first nut 70 is then threaded onto the first set of external threads 210 and tightened. The facets 220 provide a gripping surface for holding (as with a wrench) the cylindrical body 140 stationary while applying torque to the first nut 70. Both the facets 220 and first nut 70 are accessible with tools from the second side 120.

Figure 7:
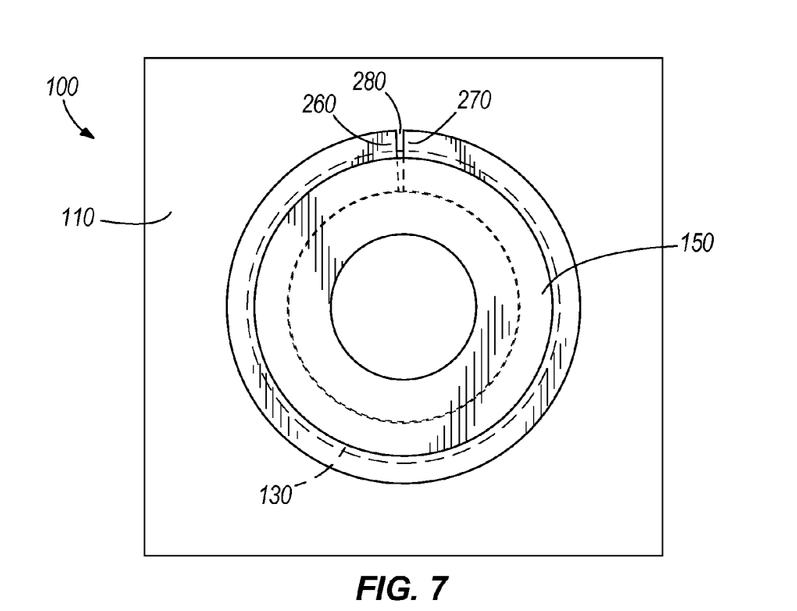
FIG. 7 is a plan view of the compression seal assembly being installed, showing the split washer tightened against the core member.
Figure 9:
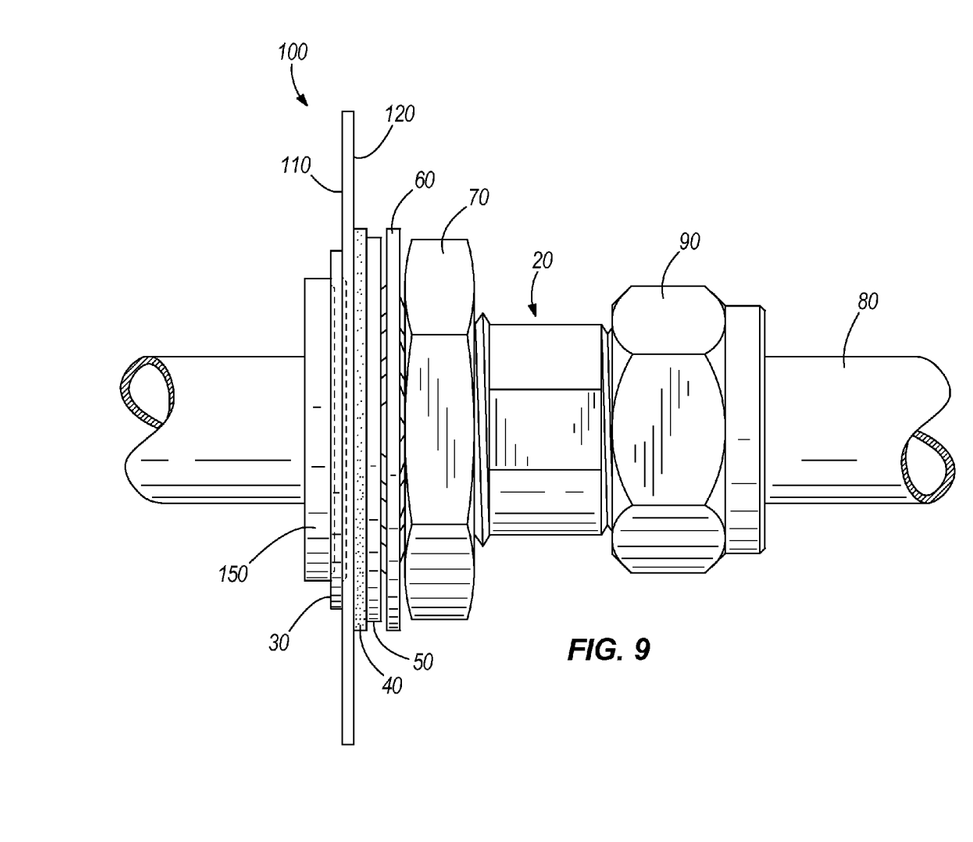
FIG. 9 is a side view of the compression seal assembly, as shown in FIG. 1.

As the first nut 70 is tightened, the split washer 30 deforms to a flat shape, exerting an axial load on the first nut 70. Also, as the first nut 70 is tightened, the seat 310 centers the split washer 30 within the wall hole 130 about the longitudinal axis 170, as illustrated in FIG. 7. The first nut 70 is tightened until the split washer 30, wall 100, gasket 40, flat washer 50, and lock washer 60 are compressed between the flange 150 and the first nut 70, as shown in FIG. 9.

After the first nut 70 is tightened, the conduit 80 is passed through the internal bore 160. The compression nut 90 is threaded onto the second set of external threads 230. The bevel surface 240 seats the lock ring within the compression nut 90 and secures the lock ring in place around the conduit 80. The compression nut 90 is tightened on the second set of threads 230 until the conduit 80 is locked in place. The facets 220 provide a gripping surface for holding the cylindrical body 140 stationary while applying torque to the compression nut 90. Both the facets 220 and the compression nut 90 are accessible with tools from the second side 120.

The smooth cylindrical portion 200 has an axial length that is adapted to accommodate the combined axial length of the split washer 30, wall 100, gasket 40, flat washer 50, and lock washer 60 such that the first nut 70 compresses these elements against the bearing surface 250. Extra washers or other spacers may be added in order to insure that the first nut 70 forms a tight connection.

The compression seal assembly 10 prevents fluid flow through the hole 130 except through the bore 160. The sealing mechanism acts along the perimeter of the wall hole 130, such that fluid is prevented from passing from one side of the wall 100 to the other side of the wall 100 through a passage defined by the space between the edge of the wall hole 130 and the smooth cylindrical portion 200 of the cylindrical body 140. In addition, in the illustrated embodiment, the lock ring on the compression nut 90 prevents fluid from passing from one side of the wall 100 to the other side of the wall 100 through the space between the internal bore 160 of the cylindrical body 140 and the conduit 80. Thus, any fluid that passes from one side of the wall 100 to the other through hole 130 must pass through the conduit 80. It should be noted that the wall 100 may be as thick as the axial gap 280, and may be, for example, a sheet of metal as in a hood or a refrigeration wall, or a sheet of drywall.

In an alternative embodiment, the compression seal assembly 10 may also be used where the operator has access to one side of a first wall and one side of a second wall spaced a distance from the first wall, but does not have access to the area directly between the walls. In this case, the compression seal assembly 10 may be installed on at least one of the walls in order to pass conduit 80 between both walls. Any suitable method may be used to align the conduit 80 as it passes from the first wall to the second wall.

In an alternative embodiment, the gasket 40 may be split, such that it may be mounted around the smooth cylindrical portion 200 by deflecting the ends and placing it directly onto the smooth cylindrical portion 200 without the need to insert it onto the cylindrical body 140 from the second end 190. In yet another embodiment, the gasket 40 is mounted on the side of the split washer 30 that abuts the first side 110 of the wall 100. The gasket 40 in this case might include a rubberized material adhered to the split washer 30. Alternatively, the compression seal assembly 10 may be installed without inserting a gasket between the wall 100 and the first nut 70. In a further embodiment, the compression seal assembly 10 may lack a flat washer 50 and a lock washer 60. In such an arrangement the first nut 70 would abut the gasket 40 and apply compressive force to the gasket 40 directly.

In a further embodiment, the cylindrical body 140 may lack the facets 220, and the first threads 210 and second threads 230 may form one continuous set of external threads. In this case, the first nut 70 is used to secure the split washer 30 and flange 150 to the wall 100 and the compression nut 90 is used to resist axial movement of the conduit 80. Alternatively, the first nut 70 could be eliminated, such that the compression nut 90 provides both the function of securing the flange 150 and split washer 30 against the wall 100 and the function of resisting axial movement of the conduit 80.

In an alternative arrangement, the bore 160 may include internal threads for receiving, for example, a threaded pipe or a plumbing nipple. In this case, the cylindrical body 140 may lack the second set of external threads 230 and the compression nut 90. In yet another embodiment, the core member 20 lacks an internal bore 160 (i.e., the flange 150 and the cylindrical body 140 are solid or the internal bore 160 is a blind bore, closed at one end). This arrangement is especially useful for plugging the wall hole 130 without the need for welding or other patching, or may be useful for installing a mounting fixture, such as a hook, on the wall 100.

Thus, the invention provides, among other things, a compression seal assembly that can be mounted onto a wall without requiring access to both sides of the wall. Various features and advantages of the invention are set forth in the following claims.

What is claimed is:

1. A compression seal assembly, adapted for mounting to a wall having first and second oppositely-facing sides and a hole having a hole diameter, the compression seal assembly comprising:
    a core member including a cylindrical body defining a longitudinal axis and a flange, the cylindrical body having a first end and a second end, the flange being rigidly attached to the first end of the cylindrical body and having a flange outer diameter that is larger than the cylindrical body but configured to be smaller than the hole diameter, the flange including a bearing surface facing axially toward the second end of the cylindrical body;
    a first set of external threads on an outer surface of the cylindrical body;
    a first nut threaded onto the first set of external threads;
    a split washer surrounding the cylindrical body adjacent the bearing surface of the flange, the split washer being helical-shaped and having first and second ends defining an axial gap therebetween, the split washer having an inner edge defining an inner diameter that is larger than the cylindrical body and an outer edge defining an outer diameter configured to be larger than the hole diameter;
    wherein the first nut is configured to be positioned on the second side of the wall and the split washer and flange are configured to be positioned on the first side of the wall;
    wherein tightening the first nut on the first set of external threads compresses the split washer between the flange and first nut, such that the split washer is deflected into a flat condition to apply an axial load on the first nut;
    wherein the split washer is configured to be passed through the hole from the second side of the wall to the first side of the wall by receiving an edge of the hole in the axial gap and ramping the split washer through the hole.

2. The compression seal assembly of claim 1, the cylindrical body further comprising a smooth cylindrical portion adjacent to the flange bearing surface, the smooth cylindrical portion having an cylindrical diameter.

3. The compression seal assembly of claim 2, wherein the distance between the inner edge of the split washer and the outer edge of the split washer defines a width of the split washer, and wherein the combined width of the split washer and the cylindrical diameter is configured to be less than the hole diameter.

4. The compression seal assembly of claim 2, further comprising a gasket surrounding the smooth cylindrical portion and configured to be positioned against the second side of the wall.

5. The compression seal assembly of claim 1, the core member further including an internal bore extending through the cylindrical body and the flange.

6. The compression seal assembly of claim 5, further including a conduit configured to be secured to the wall and that is extendable through the internal bore.

7. The compression seal assembly of claim 6, further comprising
    a second set of external threads on the cylindrical body adjacent the second end; and
    a compression nut threaded onto the second set of external threads, the compression nut providing a circumferential compressive force on the conduit to resist axial movement of the conduit with respect to the core member.

8. The compression seal assembly of claim 1, wherein ramping the split washer comprises moving the split washer in a circular motion about the longitudinal axis such that at least one side of the wall slides along the circumference of the split washer from the first end to the second end.

9. The compression seal assembly of claim 1, wherein the split washer further comprises an annular seat extending circumferentially between the inner edge of the split washer and the outer edge of the split washer, the seat centering the flange bearing surface with respect to the split washer.

10. The compression seal assembly of claim 2, wherein the smooth cylindrical portion has an axial length sufficient to accommodate the combined axial length of at least the split washer.

11. A compression seal assembly, adapted for mounting to a wall having first and second oppositely-facing sides and a hole having a hole diameter, the compression seal assembly comprising:
    a core member including a cylindrical body, a flange, and an internal bore, the cylindrical body defining a longitudinal axis, the cylindrical body having a first end, a second end, a smooth cylindrical portion positioned proximate the first end and having a cylindrical diameter, the flange being rigidly attached to the first end of the cylindrical body adjacent the smooth cylindrical portion, the flange having an outer diameter that is larger than the cylindrical body but is configured to be smaller than the hole diameter, the flange including a bearing surface facing axially toward the second end of the cylindrical body, the internal bore extending through the cylindrical body and the flange;

a split washer surrounding the core member adjacent the bearing surface of the flange, the split washer being helical-shaped and having first and second ends defining an axial gap therebetween, the split washer having an inner edge defining an inner diameter that is larger than the core member and an outer edge defining an outer diameter that is configured to be larger than the hole diameter;

a gasket;

a first set of external threads adjacent the smooth cylindrical portion;

a first nut threaded onto the first set of external threads;

a pair of external facets adjacent the first set of threads, the facets comprising flat surfaces positioned on diametrically opposed sides of the core member;

a conduit extendable through the internal bore; and wherein the gasket and the first nut are configured to be positioned on the second side of the wall and the split washer and flange are configured to be positioned on the first side of the wall, wherein tightening the first nut on the first set of external threads compresses the split washer between the flange and first nut, such that the split washer is configured to contact the wall and is deflected into a flat condition to apply an axial load on the first nut, and wherein the distance between the inner edge of the split washer and the outer edge of the split washer defines a width of the split washer, and the combined width of the split washer and the cylindrical diameter is configured to be less than the hole diameter.

12. The compression seal assembly of claim 11, wherein the gasket surrounds the smooth cylindrical portion.

13. The compression seal assembly of claim 11, further comprising
a second set of external threads on the cylindrical body adjacent the second end; and
a compression nut threaded onto the second set of external threads, the compression nut providing a circumferential compressive force on the conduit to resist axial movement of the conduit with respect to the core member.

14. The compression seal assembly of claim 11, wherein the split washer is configured to be passed through the hole from the second side of the wall to the first side of the wall by receiving an edge of the hole in the axial gap and ramping the split washer through the hole.

15. The compression seal assembly of claim 14, wherein ramping the split washer comprises moving the split washer in a circular motion about the longitudinal axis such that at least one side of the wall slides along the circumference of the split washer from the first end to the second end.

16. The compression seal assembly of claim 11, wherein the split washer further comprises an annular seat extending circumferentially between the inner edge of the split washer and the outer edge of the split washer, the seat centering the flange bearing surface with respect to the split washer.

* * * * *